United States Patent [19]

Waitl et al.

[11] Patent Number: 4,810,277

[45] Date of Patent: Mar. 7, 1989

[54] METHOD FOR FASTENING A GLASS FIBER TO A LIGHT WAVE GUIDE COMPONENT

[75] Inventors: Guenther Waitl, Regensburg; Karl Geim, Sinzing; Hans-Ludwig Althaus, Lappersdorf; Waltraud Klos, Regensburg, all of Fed. Rep. of Germany

[73] Assignee: Siemens Aktiengesellschaft, Berlin and Munich, Fed. Rep. of Germany

[21] Appl. No.: 159,626

[22] Filed: Feb. 23, 1988

[30] Foreign Application Priority Data

Apr. 30, 1987 [DE] Fed. Rep. of Germany ....... 3714525

[51] Int. Cl.4 ...................... C03B 37/025; G02B 6/38
[52] U.S. Cl. .................................... 65/4.21; 65/3.11; 350/96.21
[58] Field of Search .......................... 65/21, 3, 11, , 12, 65/4.2, 4.21; 350/96.21

[56] References Cited

U.S. PATENT DOCUMENTS

| 3,861,781 | 1/1975 | Hasegawa et al. | 65/4.21 X |
| 4,078,910 | 3/1978 | Dalgoutte | 65/4.21 X |
| 4,124,364 | 11/1978 | Dalgoutte | 65/4.2 |

FOREIGN PATENT DOCUMENTS 0207276 5/1986 European Pat. Off. .
3440437 11/1984 Fed. Rep. of Germany .

Primary Examiner—Robert L. Lindsay
Attorney, Agent, or Firm—James G. Morrow

[57] ABSTRACT

A method for hermetically fastening a glass fiber within a tube, wherein the tube can be used with light wave guide components, the tube serving as a connecting part at the component. The method provides for a tube consisting of quartz, quartz glass or glass. The glass fiber is connected to the tube at a predetermined fastening location by means of heating the tube and collapsing the tube to hermetically connect the glass fiber to the tube through melting.

14 Claims, 1 Drawing Sheet

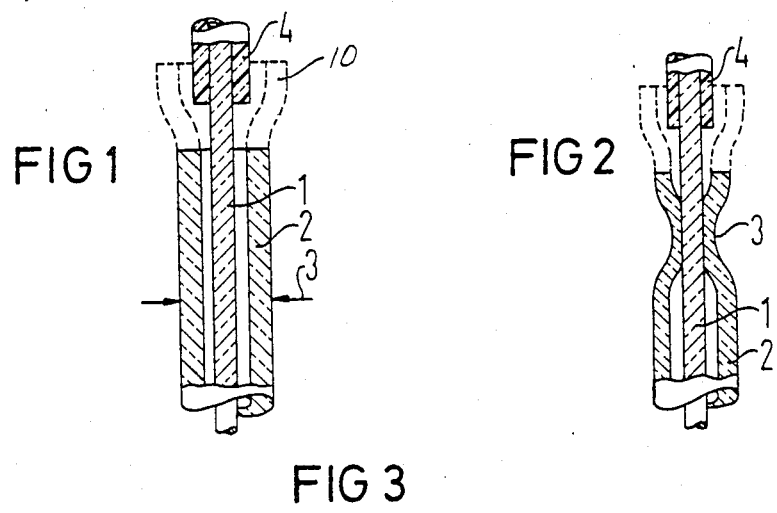
FIG 1
FIG 2
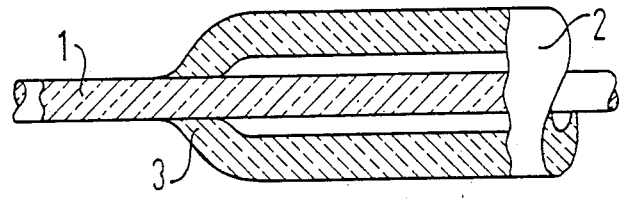
FIG 3
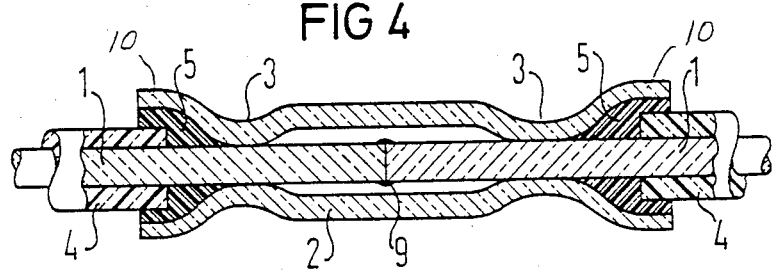
FIG 4
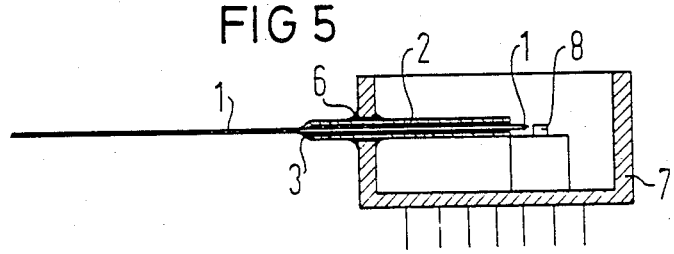
FIG 5

METHOD FOR FASTENING A GLASS FIBER TO A LIGHT WAVE GUIDE COMPONENT

BACKGROUND OF THE INVENTION

The invention relates to fastening glass fibers to other components and, in particular, to a method for hermetically fastening a glass fiber to a tube at a fastening location by melting the tube.

Highly sensitive glass fibers are used as optical fibers or light wave guides for optical transmission of data in light wave guide components. To effectively protect these glass fibers against mechanical, electrical, and other environmentally caused interferences, the fibers are hermetically sealed and fastened in a protective sheathing.

For light wave guide components having a glass fiber lead some of the following hermetic fastening methods have become known such as: metallization of the glass fiber and subsequently soldering the metallized glass fiber in into a metal capillary tube; sintering a silk-screen paste onto the glass fiber; pretinning the fiber and soldering the fiber into a metal capillary tube; and fastening the glass fiber in a metal capillary tube with glass solder. The tubes can then soldered or laser-welded into the casing wall of a component. All of these methods allow the hermetic fastening of a glass fiber, but they are normally elaborate and costly.

A further possibility for fastening glass fibers is fastening the glass fiber with an adhesive agent. The use of an adhesive agent however has problems regarding the permability of the joint under changing climatic conditions.

SUMMARY OF THE INVENTION

An object of the invention is to provide for hermetically fastening a glass fiber in a tube in an uncomplicated and cost efficient manner.

An advantage of the invention is that a metal-free connection can be accomplished.

Accordingly, this invention provides for a method for fastening a glass fiber to a tube comprising the steps of locating a first glass fiber within the tube, providing a first fastening location along the guide tube, and hermetically fastening the glass fiber to the tube at the fastening location by melting the tube.

Various other objects and advantages of the present invention will become apparent from the following description, with reference to the accompanying drawings.

BRIEF DESCRIPTION OF THE DRAWINGS

FIG. 1 illustrates a partial cross-sectional view of a fiber within a tube;

FIG. 2 illustrates a partial cross-sectional view of a fiber within a tube, wherein the tube is collapsed upon the fiber;

FIG. 3 illustrates a partial cross-sectional view of a fiber within another embodiment of a tube, wherein the tube is collapsed upon the fiber;

FIG. 4 illustrates a partial cross-sectional view of two fibers jointed within a tube, wherein the tube is collapsed upon the fibers; and FIG. 5 illustrates a cross-sectional view of a fiber within a tube, wherein the tube is fixed to a component.

DETAILED DESCRIPTION OF THE PREFERRED EMBODIMENT

Turning now to the drawings, FIG. 1 illustrates a light wave guide in the form of a glass fiber 1 arranged with a tube 2. The tube 2 is preferably fabricated from glass, quartz or quartz glass. The end portion of the glass fiber 1, located within the tube 2, is stripped of its protective coating 4 before insertion into the tube 2. An expanded region 10 of the tube 2 can be formed to accept a portion of the protective coating 4 located at the region of transition between the clean glass fiber and the coated fiber.

In FIG. 2, the glass fiber 1 is shown hermetically fastened within the tube 2. At the fastening site 3 (also indicated in FIG. 1 with an arrow 3) the tube 2 is heated and collapsed to hermetically fasten the glass fiber 1 to the inside wall of the tube 2. When the tube 2 is heated and collapsed the glass fiber is connected to the inside wall of the tube 2 wall by melting.

For connecting and melting the tube 2 onto the glass fiber 1, only one energy source is required. Suitable sources for this purpose are flames, heating spirals, high-frequency heaters, plasmas, arcs, or laser beams. No further supporting means, like solder or pastes for example, are required for this fastening method. By way of example, when glass fibers 1 have outer diameters of approximately 125 micrometers, it is preferable to use tubes 2 having inner diameters between 130 and 250 micrometers. Of course, these dimensions can be changed appropriately for glass fibers with greater or lesser outer diameters.

In the embodiment shown in FIG. 3, one end of the tube 2 is connected to the glass fiber 1 through melting to form a fastening location 3 at which there is a hermetic seal between the glass fiber 1 and the tube 2. The fastening locations 3 illustrated in FIGS. 2 and 3 serve to protect the portion of the glass fiber 1 within the tube 2 from environmental effects. For example, as illustrated in FIG. 4, a splice 9 between glass fibers 1 can be stablized and protected by the tube 2 connected to the fibers 1. FIG. 4 also illustrates the function of the expanded regions 10. These regions 10 cooperate with a filler material 5 such as a silicon filler to protect the portion of the fiber 1 between the fastening location 3 and the termination of the protective coating 4. The filler material 5 and expanded regions 10 cooperate to provide strain relief between the fiber 1 and tube 2, wherein strain is caused by dissimilar rates of expansion or contraction between the fiber 1 and tube 2 during heating and cooling. By way of example, a suitable filler material 5 is silicon, epoxy, cyanacylate base or other material that will cure in ultra-violet light.

FIG. 5 illustrates, as a further application, a glass fiber 1 and tube 2 assembly mounted with a light wave guide component 7. For use with a light wave guide component 7, the fiber 1 should be hermetically sealed within a tube 2 in a cost effective manner. To mount a glass fiber 1 to a light wave guide component 7, it is possible to provide a glass fiber 1 hermetically sealed with a tube 2, wherein the tube 2 is subsequently fixed relative to the light wave guide component 7. The glass fiber 1 can be provided with an optic lens or a taper adapted to more effectively transmit light. By way of example, the light wave guide component 7 can take the form of a transmitter component such as a semiconductor lazer. Referring again to FIG. 5, the tube is fastened in the casing wall 7 through, for example, soldering or laser welding. Preferably, the tube 2 is metallized at the connecting site 6 between the tube 2 and the casing wall 7.

A further application exists if the glass tube 2 is already an integral part of the top, sides or bottom of the casing wall 7. With the glass tube 2 in the place as part of the casing wall 7, the glass fiber 1 is slid into the tube 2, adjusted, mounted and fused to the tube 2. Fusing fiber 1 to the tube 2 can take place at the end of the tube 2 or in the middle, whereby the glass fiber 1 is still guided in tube 2 and cannot be damaged easily.

While one embodiment of the invention and several modifications thereof have been shown and described in detail herein, various other changes and modifications may be made without departing from the scope of the present invention.

We claim:

1. A method for fastening a glass fiber to a tube in a hermetically sealed manner comprising the steps of:
   locating an end portion of a first glass fiber within the tube, wherein the tube is fastened to a light wave guide component, the tube functions as a guide for the glass fiber and the tube is a material selected from the group consisting of glass, quartz glass and quartz, and wherein the end portion does not include a protective coating;
   providing a first fastening location along the guide tube; and
   hermetically fastening the glass fiber to the tube at the fastening location by melting and collapsing the tube such that it fuses with the end portion.

2. The method of claim 1 further comprising the steps of:
   permanently deforming the tube at the fastening location;
   providing the tube with a first expanded region at one end of the tube; and
   providing a filler material at the expanded region of the tube such that it contacts the glass fiber.

3. The method of claim 2 wherein the step of permanently deforming the tube at the fastening location further comprises the step of heating the tube to soften the tube at the fastening location such that when the tube is permanently deformed at the fastening location such that the glass fiber is melted and connected to the tube.

4. The method of claim 3 wherein the filler material is an ultraviolet curing material.

5. The method of claim 3 wherein a heating coil is used to melt the tube.

6. The method of claim 3 wherein a melting flame is used to melt the tube.

7. The method of claim 3 wherein a high frequency heater is used to melt the tube.

8. The method of claim 3 wherein a plasma is used to melt the tube.

9. The method of claim 3 wherein an arc is used to melt the tube.

10. The method of claim 3 wherein a laser beam is used to melt the tube.

11. The method of claim 3 further comprising the steps of:
    locating a second glass fiber within the tube;
    optically connecting the glass fiber and the second glass fiber;
    providing a second fastening location along the guide tube;
    hermetically fastening the second glass fiber to the tube at the fastening location by melting the tube;
    permanently deforming the tube at the second fastening location;
    providing the tube with a second expanded region at one end of the tube; and
    providing a filler material at the second expanded region of the tube such that it contacts the second glass fiber.

12. The method of claim 3 wherein the tube is fixed to a casing wall of a light wave guide component with an adhesive agent.

13. The method of claim 3 wherein the tube is fixed to a casing wall of a light wave guide component by soldering.

14. The method of claim 3 further comprising the step of attaching a metal sheathing to the tube, wherein the sheathing is solderable to the casing of a light wave guide component.

* * * * *